No. 863,771. PATENTED AUG. 20, 1907.
J. ANDERSON.
SLED BRAKE.
APPLICATION FILED APR. 17, 1907.
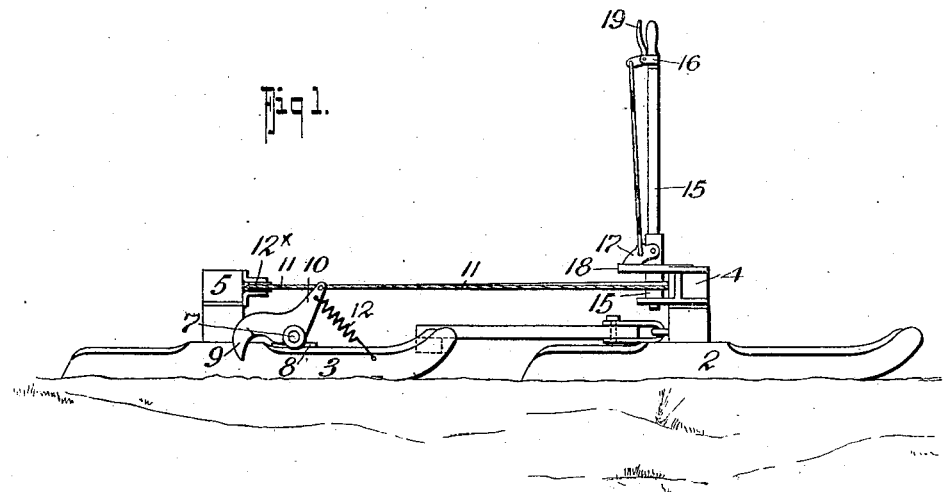
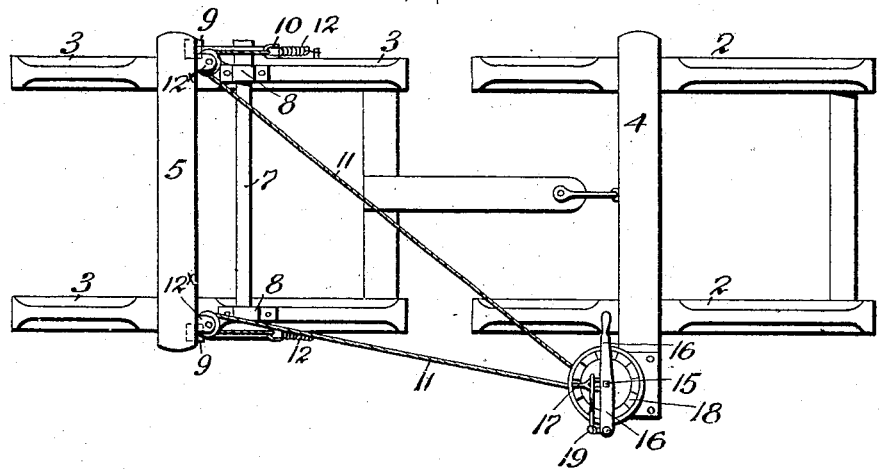
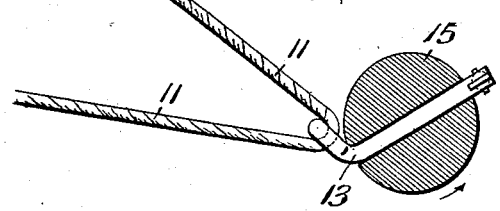
WITNESSES:
John T. Schrott
Charles H. Wagner
INVENTOR
John Anderson.
BY
Fred G. Dieterich
ATTORNEY

UNITED STATES PATENT OFFICE.

JOHN ANDERSON, OF GOLDEN, BRITISH COLUMBIA, CANADA.

SLED-BRAKE.

No. 863,771.        Specification of Letters Patent.        Patented Aug. 20, 1907.

Application filed April 17, 1907. Serial No. 368,701.

*To all whom it may concern:*

Be it known that I, JOHN ANDERSON, a citizen of the Dominion of Canada, residing at Golden, in the Province of British Columbia, Canada, have invented a new and useful Improvement in Sleigh-Brakes, of which the following is a specification.

This invention relates to a sled brake particularly designed for application to a bob sleigh such as is used for hauling logs or ore in a mountainous district, or for a heavy sled of any kind on steep inclines.

A sled brake as usually designed is not suited for heavy work, save where the snow is fresh or the track new, as the drag which performs the braking is not adapted to secure an effective hold on a hard or icy track and the means for applying the drag is generally insufficient to stand the strain that may be imposed upon it when the drag encounters a stone or snag in the track. Such drag brakes are also usually attached to the leading sled of a bob in order to be under the control of the driver but such is inadvisable as any irregularity of the track may engage one or the other of the drag hooks and impose a severe side strain on the team which at times may carry them off their feet. I have overcome these objections in the brake which is the subject of this application by providing drag hooks of a strong form and adapted to secure an effective hold of the hard packed snow or ice of the track and I apply these drag hooks to the back sled only by a powerful mechanism on the bolster of the front sled, connecting the mechanism to the drag hooks by a flexible connection that will when applied have a certain measure of elasticity to yield when an obstacle is encountered in the track by one or the other of the drag hooks.

The invention is fully described in the following specification reference being made to the drawings by which it is accompanied, in which:

Figure 1 is an elevation of a bob sleigh showing the application of my brake thereto, Fig. 2, a plan of the same and Fig. 3, a detail of a means whereby the flexible wire may be secured to the shaft round which it is coiled to apply the brake.

In these drawings the forward and after sleds of a bob sleigh are represented by 2 and 3, 4 and 5 being their respective bolsters.

Secured on the outer ends of a stout cross shaft 7 mounted in bearings 8 on the upper side of the after sled runners in front of and adjacent to its bolster 5 are brake drag hooks 9, so shaped that when drawn into contact with the surface of the track, they will secure an effective hold thereof to check forward movement of the sleigh. These drag hook members 9 are extended beyond their attachment to the cross shaft 7 as at 10 to afford a means for the attachment of
a flexible wire rope 11 by which they are operated from the leading sled to apply the brake, and also for the attachment of springs 12 by which the hooks are normally maintained clear of the track.

The ends of the flexible wire rope 11 are connected one to the end 10 of each drag hook, and, passing round sheaves 12× secured to the bolster 5 of the after sled, adjacent to the end of each drag hook, the loop or bight is removably secured by means of a hook or eyepin 13 to the lower end of a vertical handle shaft 15 which is rotatably mounted in bearings on a lateral extension of the bolster 4 of the forward sled, so as to be in a convenient position for operation by the driver of the team, a cross handle 16 being provided for effecting rotation.

The vertical shaft 15 is checked against back rotation by a pawl 17 and ratchet 18 the release of which pawl from the ratchet may be effected by a rod from a handle lever 19 on the cross handle.

The wire rope 11 is removably secured to the lower end of the vertical shaft on which the rope is wound to apply the brake, in a manner somewhat as shown in Fig. 3 so that it may be quickly detached to permit of the shaft 15 being lifted out of the bearings while loading or unloading the sleigh.

A powerful and effective brake is thus provided which, while under the control of the driver from the front, is operative on the following sled only so that its application exercises no disturbing effect upon the team or upon the line of movement of the sleigh.

The flexible wire rope by which connection is made offers a yielding resiliency if an obstacle is encountered by either of the drag hooks, and the manner in which this wire rope is connected to the rotatable vertical shaft permits the tension to accommodate itself somewhat during application.

Having now particularly described my invention and the manner of its application I hereby declare that what I claim as new and desire to be protected in by Letters Patent, is:

1. As a sleigh brake, the combination with a sleigh having forward and after sleds, of a shaft in bearings across the after sled having brake members attached to each end adjacent to the runners which brake members are forwardly hooked and are susceptible of having the forwardly hooked portions brought into contact with the track, lever members secured to the brake shaft, and flexible connections from the hook members which flexible connections are carried backward round sheaves on the bolster of the after sled and are removably connected to the lower end of a rotatable vertical shaft on the bolster of the forward sled.

2. As a sleigh brake, the combination with a sleigh having forward and after sleds, of a shaft movable in bearings across the after sled such shaft having secured on it braking members each comprising a forwardly hooked portion susceptible of being moved into contact with the track and a lever portion on the opposite side of the shaft connection, a flexible connection attached to the free end of the lever portion of the brake members such flexible connection passing round sheaves on the forward side of the bolster of the after sled and thereafter passing through an eye connected to the lower end of a vertical handle shaft rotatably mounted on the forward sled in such a manner that when the vertical shaft is rotated the flexible rope will be wound thereon and the hook members drawn into contact with the track, and means for normally retaining the brake hook clear of the track.

In testimony whereof I have signed my name to this specification in the presence of two subscribing witnesses.

JOHN ANDERSON.

Witnesses:
 CHAS. A. WARREN,
 JOHN RUSSELL.